July 18, 1950 R. E. HEWLETT 2,515,772
AUTOMATIC ORANGE JUICER
Filed June 6, 1945 3 Sheets-Sheet 1
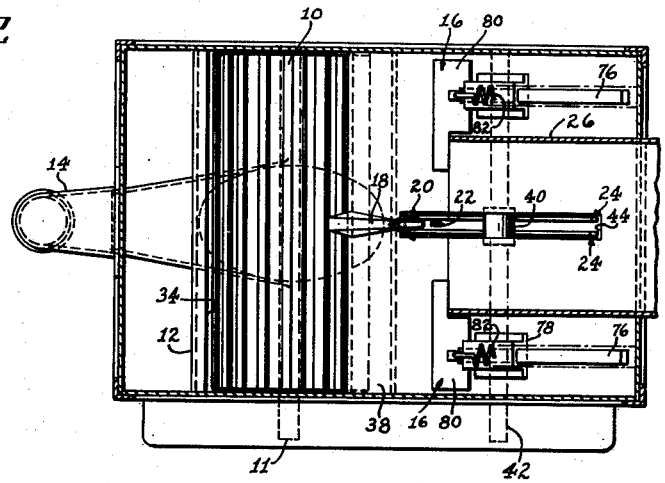
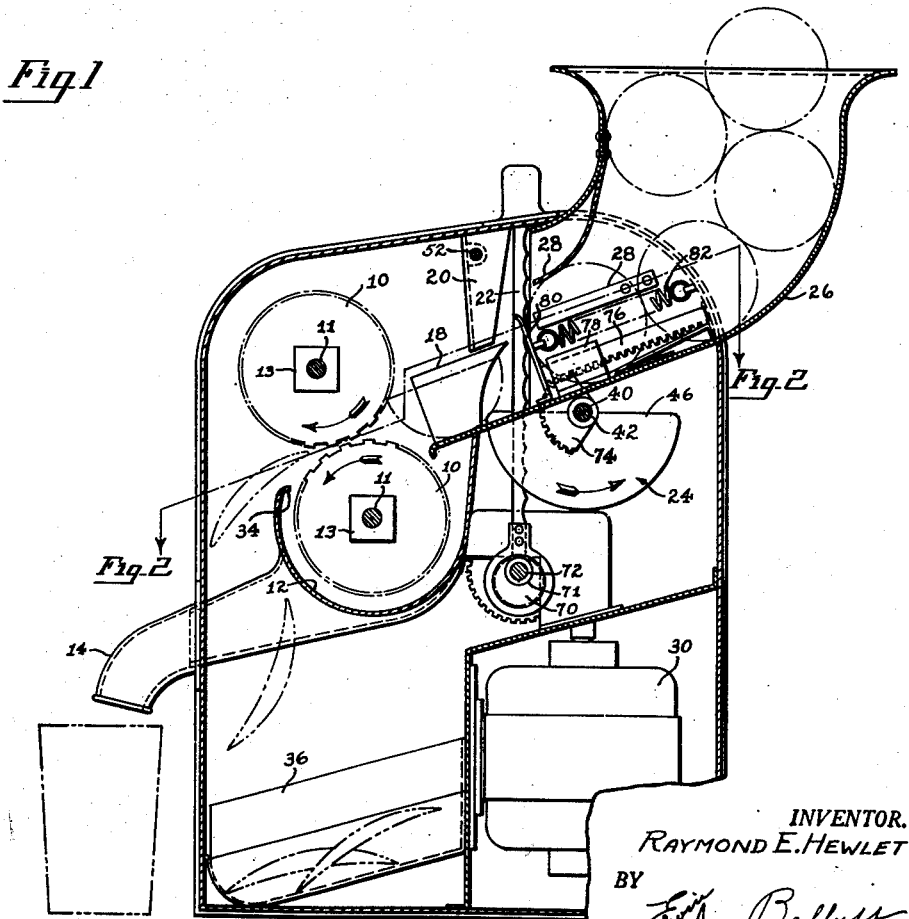
INVENTOR.
RAYMOND E. HEWLETT
BY
ATTORNEY July 18, 1950  R. E. HEWLETT  2,515,772
AUTOMATIC ORANGE JUICER
Filed June 6, 1945  3 Sheets-Sheet 2
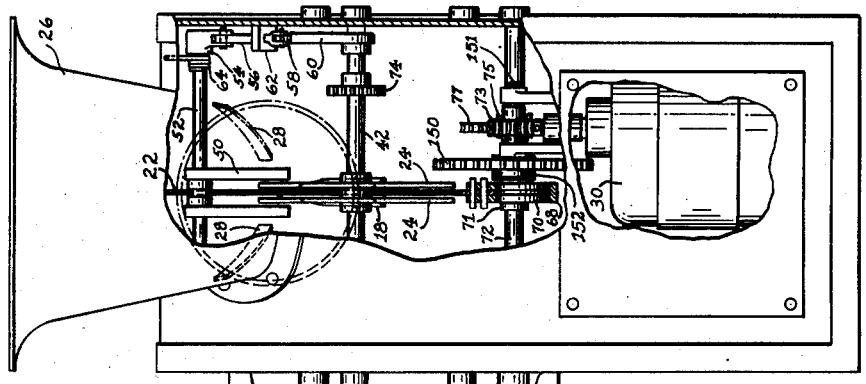
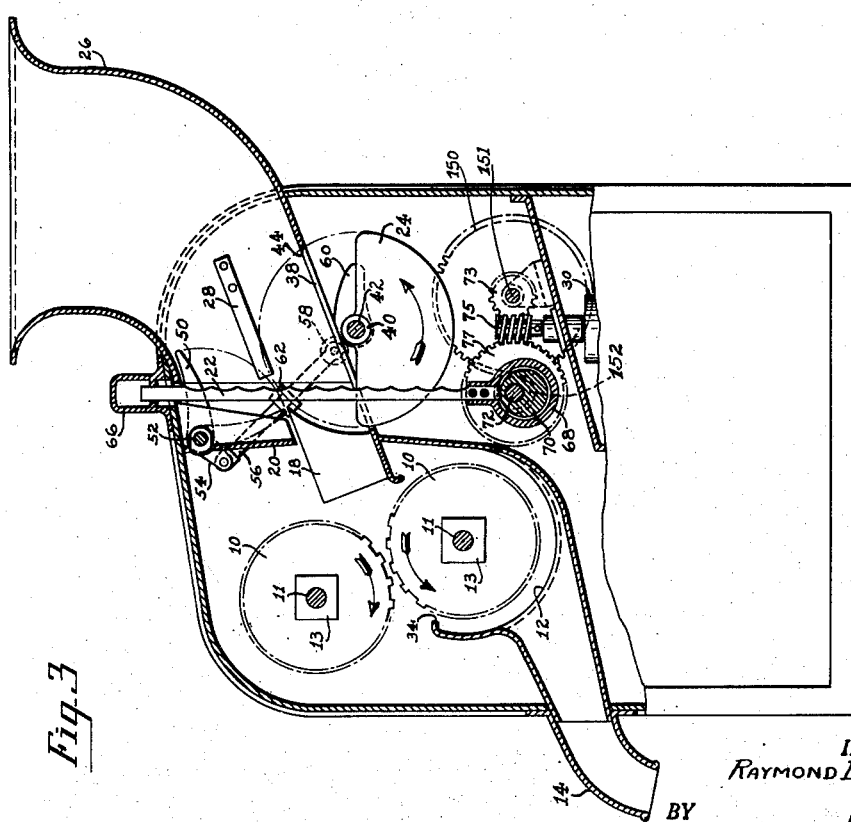
INVENTOR.
RAYMOND E. HEWLETT
BY
ATTORNEY July 18, 1950 R. E. HEWLETT 2,515,772
AUTOMATIC ORANGE JUICER
Filed June 6, 1945 3 Sheets-Sheet 3
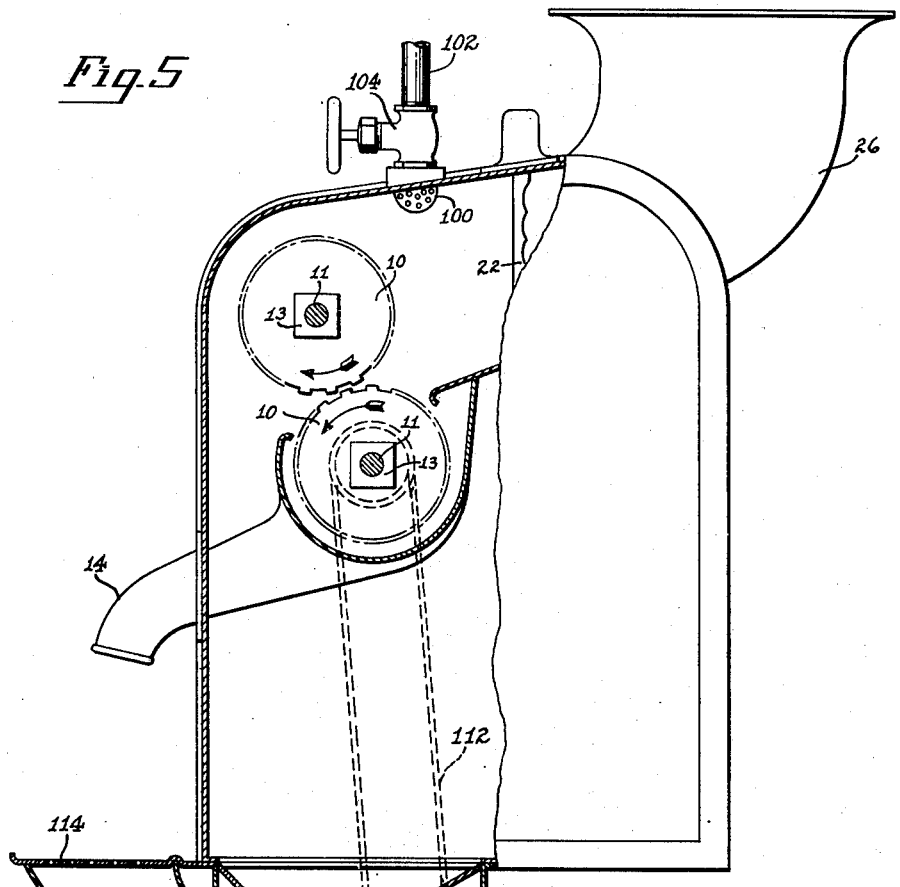
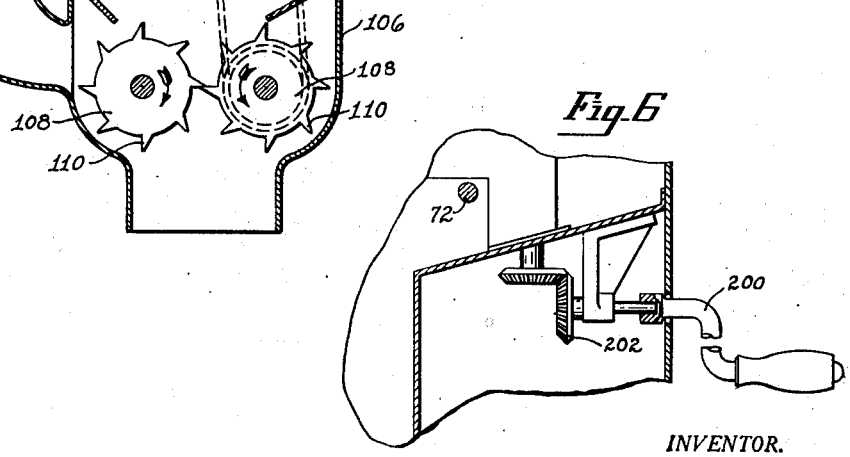
INVENTOR.
RAYMOND E. HEWLETT
BY
Edwin J. Balluff
ATTORNEY Patented July 18, 1950

2,515,772

UNITED STATES PATENT OFFICE 2,515,772

AUTOMATIC ORANGE JUICER

Raymond E. Hewlett, Detroit, Mich., assignor to Hewlett Manufacturing Company, Detroit, Mich., a copartnership consisting of David A. Wallace and Ray E. Hewlett Application June 6, 1945, Serial No. 597,872

19 Claims. (Cl. 100—47)

This invention relates to orange juicing apparatus and has particular reference to a new and improved type which is particularly designed for use in homes, restaurants, hotels, hospitals, soda fountains, etc., for automatically cutting and squeezing citrus fruit, such as oranges, and delivering the juice thereof ready for use.

While many forms of orange juicing machines have been made heretofore for commercial or domestic use, they all appear to be open to the great objection that a considerable amount of time and effort is required to handle the fruit and use the machine. In connection with the use of orange juicers in commercial establishments, such as restaurants, the time element is a very important factor. My invention aims to provide a machine which will automatically handle the fruit and deliver the juice therefrom as needed without any attention on the part of the operator, except to operate the motor switch which drives the machine. As illustrated it is arranged to operate continuously to deliver juice until the supply of fruit in the hopper is exhausted. The machine may however be driven manually by a crank if desired.

Principal objects of the invention are to provide:

A new and improved orange juicer;

A novel and efficient automatic orange juicer which functions to cut the fruit, squeeze the juice therefrom, and to deliver the juice ready for immediate use;

A fruit juicer which is particularly adapted to remove substantially all of the available juice from citrus fruit without excessively contaminating it with the piquant tasting contents of the rind;

An automatic orange juice machine which is adapted to automatically feed the fruit from a hopper, to cut the fruit and squeeze the juice therefrom, and to deliver the juice ready for immediate use;

Operating mechanism which is mainly confined against contact with the juice extracted from the fruit and which is so sealed from the chamber in which the juice is extracted as to permit convenient washing of the latter chamber by a stream of water.

Other and further objects of the invention will be apparent from the following description and claims and will be understood by reference to the accompanying drawings, of which there are three sheets, which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings:

Fig. 1 is a side elevational view of a machine embodying the invention with the side covering removed to show the working parts of the machine;

Fig. 2 is a sectional view taken generally along the line 2—2 of Fig. 1;

Fig. 3 is a view similar to Fig. 1, but taken approximately through the center of the machine;

Fig. 4 is an end elevational view of Fig. 3;

Fig. 5 is a view similar to Fig. 1 and illustrating a modified form of the machine provided with means for flushing the working parts thereof and for reducing the rind and pulp left from the fruit after the juice has been expressed therefrom; and Fig. 6 is a fragmentary sectional view of a modified form of the invention employing a hand crank instead of an electric motor.

Generally speaking, an orange juicer embodying my invention comprises means in the form of spaced rolls 10 arranged and operable for squeezing sections of a piece of fruit to displace the juice therefrom, collecting means in the form of a trough 12 positioned for collecting the juice separate from the rind and pulp, a spout 14 arranged for discharging the fruit juice into a suitable receptacle, such as a glass, pusher means 16 operable for feeding one or more fruit sections to said rolls 10, dividing means 18 and 20 positioned relative to said pusher for positioning a fruit section in front of each pusher 16, a cutter 22 for cutting fruit into sections, feeding means 24 and 50 for positively feeding fruit to and past said cutter 22, a hopper 26 for holding a supply of fruit, such as oranges, and gravitationally feeding such fruit to the feeder 24, said feeder 24 being constructed and arranged so as to hold back fruit in the hopper from coming through until the one being acted upon by the cutter 22 is cut in two, guide means 28 in the form of a plurality of flexible spring leaves operable for guiding and centering the fruit relative to the cutter 22 so that fruit of all sizes will be cut into two sections of roughly equal size, a source of power such as an electric motor 30, and suitable power transmitting connections between the motor 30 and the operating parts of the machine for actuating the same.

The machine includes a suitable casing and frame designed to operatively support the various elements of the machine and to enclose the same.

The rolls 10 are ribbed and grooved, and as illustrated are arranged for rotation on parallel axes for squeezing the fruit sections to separate the juice therefrom. The rolls 10 may be provided with trunnions 11 which are journaled in bearing blocks 13 suitably supported by the frame of the machine. Preferably the rolls 10 are spaced apart so that the seeds and rind of the fruit will not be disintegrated as they pass between the rolls. This spacing of the rolls also guards against excessive extraction of the piquant tasting contents of the rind. On one side of the machine the trunnions 11 project beyond the bearings 13 where they are provided with gears 32 which intermesh, and which in turn are connected by gearing to the motor 30 so that during the operation thereof the rolls 10 will be driven in the direction indicated by the arrows. The corrugated surface of the rolls helps function to feed the fruit sections to the rolls.

The collecting means comprises a substantially leakproof trough which extends transversely of the casing of the machine below and closely spaced relative to the lower roll 10, the upper edge 34 being bent toward the surface of the roll 10 so as to help to separate the rind and pulp from the roll 10 and prevent such rind and pulp from passing into the trough 12. The sides of the trough may be formed by the side walls of the casing. The trough 12 is provided with a spout 14 which projects downwardly and outwardly of the machine for delivering the juice therefrom so that a receptacle, such as a glass, may be positioned below the spout 14 for collecting the juice.

The rind and pulp, after being discharged from between the rolls 10, are ejected so as to fall outwardly of the trough 12 and into a waste receptacle 36 which may be positioned in the machine below the trough 12, or an arrangement like that illustrated in Fig. 5 may be employed. The casing is formed so that the receptacle 36 may be removed from the machine for emptying the contents thereof.

The hopper 26 is arranged to hold a supply of fruit, such as oranges, and to deliver the same, one by one, gravitationally on to a sloping surface formed by partition member 38 which extends transversely of the casing and terminates just short of the lower roll 10. The spring leaves 28 forming the guide means may project inwardly from the side walls of the chute at the bottom of the hopper 26 and in the direction of the movement of the fruit along the surface provided by the partition 38. These spring leaves are flexible, and as illustrated they are provided so that the fruit, regardless of its size, will be positioned relative to the cutter 22 so that such fruit will be cut in substantially two equal halves.

The feeding means includes a feeder 24 which comprises a pair of spaced parallel, semi-circular segments mounted on a hub 40 which in turn is fixed for rotation to a shaft 42 which is journaled for rotation in suitable bearings in the frame. The shaft 42 is driven by suitable gearing from the motor 30 so as to rotate the feeder 24. The partition 38 is provided with a slot 44 along the center thereof as illustrated in Fig. 2, and the feeder is adapted to project through this slot 44 so as to advance an orange against the cutting edge of the cutter 22.

As will be apparent from Fig. 1, the straight edge 46 of the feeder will engage the periphery of an orange while it is positioned by the guide means 28, and will press such orange against the cutting edge 22 which is positioned so as to be straddled by the two parts of the feeder 24, as clearly illustrated in Fig. 2. The circular edges of the feeder 24 are arranged to react against the periphery of the next orange in the hopper and to hold the same back until after the cutter 22 has finished cutting the orange being advanced by the edge 46 in two. After advancing one piece of fruit past the cutter 22, the feeder 24 is arranged to move out of the way and permit the next piece of fruit in the hopper to roll down against the cutting edge of the cutter 22. Thereafter as the feeder 24 begins a new cycle, it will repeat the operation just described.

Additional feeding means may be employed to cooperate with the feeder 24, and this additional feeding means comprises a pair of arms 50 which are rockably mounted on shaft 52. The arms 50 may, like the feeder 24, straddle the cutter 22, and are positioned adjacent the top of the chute formed by the lower end of the hopper for pressing downwardly on the piece of fruit which is being advanced by the feeder 24. The arms 50 also serve to advance the fruit completely past the blade after the feeder 24 has completed its stroke, in the event that, due to the size or shape of the fruit, the feeder 24 has not completely forced the latter past the blade.

The shaft 52 is provided with an arm 54 to which one end of a link 56 is connected, the other end of the link being provided with a roller 58 which is positioned in the path of a rotatable cam 60 mounted on the shaft 42 so that upon rotation of the shaft 42 the arms 50 will move in synchronism with the feeder 24 for feeding an orange to the cutter 22. The link 56 is held in position by a guide 62. A coil spring 64 connected to the shaft cooperates therewith to return the arms 50 to their inoperative position, as illustrated in full lines in Fig. 3.

The cutter 22 may comprise any suitable form of cutting device, such for example as a scalloped edge knife as illustrated, the upper end of which is suitably mounted in a guide 66 while the lower end of such knife is connected to a follower 68 mounted on and reciprocated by a rotary cam 70 carried by a hub 71 free on shaft 72. Hub 71 is connected by a train of gearing including relatively small worm gear 73 engaged with the worm 75 on the shaft of the motor 30 for reciprocating the cutter 22 during operation of the motor. This train of gearing includes a large gear 150 fixed to a countershaft 151 on which the small worm gear 73 is also fixed. The large gear 150 which is meshed with a smaller gear 152 fixed to the hub 71, rotates the cam 70 several times during each rotation of the gear 73 by the worm 75. The shaft 72 is connected by worm gear 77 to worm 75 to be driven from and by the motor 30 during the operation thereof. Since the worm gear 77 is much larger than the worm gear 73, the shaft 72 which supplies the power to rolls 11 and feeder 24 and arms 50 is rotated at a slower speed than the cam 70 and, therefore, the cutter 22 is reciprocated throughout a plurality of cycles during each feeding operation of feeder 24 and arms 50. The gearing is suitably constructed and arranged so that the rolls 10, the cutter 22, and the feeding means, including the feeder 24 and the arms 50, will be operated continuously for acting on the fruit as it feeds gravitationally from the hopper 26 on to the table surface 38.

The shaft 42 connected by gears to the shaft 72 so as to rotate therewith is provided with a pair of gear sectors 74, each of which is cooperable with the teeth of a rack 76 which is slidable in a guide 78. The racks 76, of which two are provided, one at each side of the partition 38, form a part of the pusher means 16, such means further including the pushers proper 80 which face towards the rolls 10 and are arranged for pushing the sections of the fruit toward and between the rolls 10. The pushers 16 are each normally maintained in their retracted position, as illustrated in Figs. 1 and 2, by means of a spring 82, one end of the spring being connected to the pusher proper 80, while the other end thereof is connected to the frame of the casing at one side of the hopper 26.

Upon rotation of the shaft, the teeth of the sector 74 are adapted to engage the teeth of the rack 76 and to advance the pusher proper and the fruit sections in front of the pusher proper 80 toward the rolls 10. The sector 74 is so arranged on the shaft 42 and relative to the feeding means 24 that the pushers 80 will remain in their retracted position until after a piece of fruit has been cut in sections by the cutter 22. Thereafter the dividers 18 and 20 are arranged to act on the sections of fruit so as to cause the same to separate and lie upon that part of the partition 38 forwardly of the pushers 80. As the cut sections of fruit are thus separated they generally lie face up on the partition 38. However, in some instances, due to the shape and mass distribution of the sections, they may roll over and lie with their cut sides disposed downwardly. In either event, the pushers advance the cut sections of fruit to the rolls which are adapted to squeeze them while in either position.

Thereafter, the sector 74 is arranged to cooperate with the teeth 76 so as to advance the pushers 80 and urge the sections of the fruit between the rolls 10 so that as the juice is squeezed therefrom, the juice will flow down over the lower roll 10 into the trough 12, while the pulp and seeds will remain in the rind and be discharged outwardly of the trough and into the receptacle 36. As soon as the teeth of the gear sector 74 pass out of contact with the teeth of the rack 76, the latter will be retracted to their normal position by means of the springs 82 so as to be in position for its next cycle of operation upon the succeeding fruit.

In lieu of the motor 30, a hand crank 200 (Fig. 6) may be provided and operatively connected to a gear 202 of the gearing for manually operating the machine.

In the modification as illustrated in Fig. 5, the construction is the same as that heretofore described except for the following additions. A spray head 100 is arranged in the upper part of the machine and connected with a water line 102 under the control of a hand valve 104 so that after the machine has been used, the interior parts of the machine may be flushed with water for rinsing and cleaning the same.

In lieu of the receptacle 36, the rind and waste may be discharged directly into a chamber 106 forming part of a reducing means for comminuting the waste so that it may be fed directly into the sewer system to which the lower end of the chamber 106 may be suitably connected.

The reducing means may comprise a pair of power driven rollers 108 provided with intermeshing cutting teeth 110 for chewing up and reducing the rind and pulp as it is discharged from the rolls 10. The rolls 108 may be geared to rotate together in opposite directions, and one of the rolls may be connected by a belt or chain drive 112 to be driven from a pulley rotatable with the lower one of the rolls 10 or the gearing for driving the same. The rolls 108 are driven in the direction shown by the arrows in Figure 5 in order to positively propel the rind and pulp through the outlet of the chamber 106 and into a drain below the outlet.

A grilled opening 114 may be arranged below the spout 14 for catching drippings discharged through the spout 14 and feeding such material into the chamber 106.

The outer periphery of the rolls 10 may be provided with a thin coat of rubber or similar material which is vulcanized or otherwise suitably secured to the rolls. This coating should be corrosion and acid proof and would give a slight resiliency to the rolls and help feed fruit to the rolls and prevent abrasion of the skins thereof.

While I have illustrated and described preferred embodiments of my invention, it is understood that these are capable of modification and I therefore do not wish to be limited to the precise details set forth but desire to avail myself of such changes and alterations as fall within the purview of the following claims.

I claim:

1. In an orange juicer, a pair of rolls positioned and operable for squeezing fruit sections therebetween to displace juice therefrom, collecting means positioned for collecting said juice separate from the rind, pusher means including a member operable for feeding each of a pair of sections of fruit respectively to said pair of rolls, a divider positioned relative to said pusher means for positioning a fruit section in front of each of said members, a cutter for cutting fruit such as oranges into completely severed sections, feeding means operable for positively feeding a piece of fruit to said cutter, and power driven means operatively connected to said rolls, pusher means, cutter, and feeding means for operating the same.

2. In an orange juicer, a pair of rolls positioned and operable for squeezing complementary sections of a piece of fruit therebetween to displace juice therefrom, collecting means positioned for collecting said juice separate from the rind and delivering such juice to a receptacle, means operable for feeding said complementary fruit sections to said pair of rolls, a divider positioned relative to said feeding means for positioning each of said complementary fruit sections in front of said feeding means, a cutter for cutting fruit such as oranges into at least two complementary sections, fruit advancing means operable for positively feeding a piece of fruit to said cutter, a hopper for fruit and arranged to deliver fruit, one by one, gravitationally to said fruit advancing means, said fruit advancing means being constructed and arranged for preventing the delivery of fruit from said hopper to said cutter when said fruit advancing means is feeding a piece of fruit to said cutter, and power driven means operatively connected to said rolls and fruit advancing means for operating the same.

3. In a fruit juicer, a pair of rolls positioned relative to each other and operable for simultaneously squeezing complementary sections of a piece of fruit therebetween to squeeze juice therefrom, collecting means positioned for collecting said juice separate from the rind, a cutter for cutting pieces of fruit into complementary sections, feeding means operable for positively feeding a piece of fruit to said cutter, means operable for substantially simultaneously delivering all severed sections of said piece of fruit from said cutter to said pair of rolls, and means for collecting the rind and pulp ejected from said rolls separate from the juice extracted therefrom.

4. In an orange juicer, rolls positioned and operable for squeezing half fruit sections therebetween to squeeze juice therefrom, collecting means positioned for collecting said juice separate from the rind and delivering such juice to a receptacle, a cutter for cutting oranges in half, a sloping surface, a hopper for fruit and arranged to deliver fruit, one by one, gravitationally to said surface which extends from said hopper towards said rolls, said cutter being arranged between said hopper and rolls, means for feeding fruit on said surface to said cutter, yieldable means for centering said fruit relative to said cutter adapted to center pieces of fruit of different sizes, and means for delivering half fruit sections from said cutter to said rolls.

5. In a juicer for fruit such as oranges, means operable for squeezing fruit sections to squeeze juice therefrom, collecting means positioned for collecting said juice separate from the rind and delivering such juice to a receptacle, a cutter for cutting pieces of fruit in sections, a sloping surface, a hopper for fruit and arranged to deliver fruit, one by one, gravitationally to said surface, said surface extending from said hopper to said fruit squeezing means and said cutter being arranged intermediate the extremities of said surface between said hopper and said fruit squeezing means, means for feeding fruit along said surface to said cutter, means for centering said fruit relative to said cutter, and means for propelling fruit sections from said cutter to said fruit squeezing means.

6. In a juicer for fruit such as oranges, means operable for squeezing fruit to squeeze the juice therefrom, collecting means positioned for collecting said juice separate from the rind, a pusher operable for feeding fruit to said fruit squeezing means, a cutter for cutting pieces of fruit in sections, a feeder for positively feeding a fruit to said cutter comprising fruit contacting elements for engaging a piece of fruit at respectively opposite extremities, a hopper for fruit and arranged to deliver fruit, one by one, gravitationally to said feeder, one of said fruit contacting elements of said feeder being constructed and arranged for preventing the delivery of fruit from said hopper to said cutter when said feeder is feeding a fruit to said cutter, and power driven means operatively connected to said fruit squeezing means and feeder for operating the same.

7. In an orange juicer, means comprising a pair of rolls positioned and operable for simultaneously squeezing a pair of fruit sections to squeeze juice therefrom, collecting means positioned for collecting said juice separate from the rind, a pair of pushers operable for simultaneously feeding a pair of sections of a single piece of fruit to said rolls, a dividing means positioned relative to said pushers for positioning a fruit section in front of each of said pushers respectively, a cutter for cutting pieces of fruit into a pair of sections, feeding means operable for positively feeding a fruit to said cutter, and power driven means operatively connected to said squeezing means, pushers, cutter and feeding means for operating the same.

8. In a juicer for fruit such as oranges, means positioned and operable for squeezing fruit sections to squeeze juice therefrom, collecting means positioned for collecting said juice separate from the rind, a pair of pushers, each operable for feeding a fruit section to said fruit squeezing means, a dividing means positioned relative to said pushers for positioning a half fruit section in front of each of said pushers, a cutter for cutting pieces of fruit into sections, feeding means independent of said pushers operable for positively feeding a fruit to said cutter, power driven means operatively connected to said squeezing means, pushers, cutter and feeding means for operating the same, and a hopper for fruit and arranged to deliver fruit, one by one, gravitationally to said feeding means.

9. A juicer for fruit such as oranges comprising means in the form of rolls arranged and operable for squeezing sections of fruit therebetween to squeeze juice therefrom, collecting means in the form of a trough positioned for collecting the juice separate from the rind and pulp, a spout arranged for discharging such juice into a suitable receptacle, pusher means operable for feeding one or more fruit sections to said rolls, dividing means positioned relative to said pusher means for positioning a fruit section in front of each of said pusher means, a cutter for cutting fruit in sections, feeding means independent of said pushers for positively feeding fruit to said cutter, a hopper for holding a supply of fruit and gravitationally feeding such fruit to the feeding means, guide means operable on fruit of different sizes for guiding and centering the fruit relative to the cutter, a source of power such as an electric motor, and power transmitting connections between said motor and the operating parts of the machine for actuating the same.

10. In a juicer for fruit such as oranges, a casing having a hopper for fruit and a spout for delivering fruit juice therefrom, means operable for squeezing fruit sections, collecting means for collecting the juice squeezed from said sections and delivering such juice to said spout, a surface on which said hopper is arranged to gravitationally deliver fruit, one by one, a reciprocating cutting knife positioned relative to said surface for cutting fruit into sections as said fruit moves along said surface towards said squeezing means, feeding means for positively feeding fruit to said cutting knife, mechanism for reciprocating said cutting knife throughout a plurality of cycles during a single feeding operation of said fruit feeding means, and means for delivering the sections into which the fruit is cut by said cutting knife to said squeezing means.

11. Apparatus for extracting juice from articles of fruit such as oranges comprising a pair of rolls adapted to squeeze sections of an article of fruit therebetween, a hopper for receiving articles of fruit to be juiced having an outlet passageway leading toward said rolls and adapted to bring said articles into single file alignment at a location spaced from and in advance of said rolls, means for severing each of said articles during its movement toward said rolls including a knife element in advance of said rolls, a reciprocable pusher member for positively propelling said severed sections of said article to and against said rolls, and mechanism for drivingly rotating said rolls and reciprocating said pusher member.

12. Apparatus for extracting juice from fruit such as oranges comprising a pair of rolls adapted to squeeze sections of a piece of fruit therebetween, a hopper for receiving fruit to be juiced having an outlet passageway leading toward said rolls and adapted to bring pieces of fruit into single file alignment at a location spaced from and in advance of said rolls, means for severing each of said pieces of fruit during its movement from said location toward said rolls including a reciprocable knife element and a feeding member for successively urging said pieces past said knife element, a reciprocable pusher member for positively urging severed sections of each piece of fruit toward and against said rolls, and mechanism for drivingly rotating said rolls and reciprocating said knife element including means for propelling said feeding member of said severing means and said reciprocable pusher member through their respective operative strokes in a predetermined timed relation.

13. Apparatus for extracting juice from fruit such as oranges comprising a pair of rolls adapted to squeeze severed sections of fruit therebetween, a hopper for receiving fruit to be juiced having an outlet passageway leading toward said rolls and adapted to bring pieces of said fruit into single file alignment at a location spaced from and in advance of said rolls, means for severing each of said pieces of fruit during its movement from said location toward said rolls including a reciprocable knife element and a feeding member for successively urging said pieces of fruit past said knife element, a reciprocable pusher member for positively urging severed sections of each fruit toward and against said rolls, mechanism for drivingly rotating said rolls and reciprocating said knife element including means for propelling said feeding member of said severing means and said reciprocable pusher member through their respective operative strokes in a predetermined timed relation, and quick acting return mechanism for restoring said pusher member to the end of its stroke remote from said rolls before the next successive piece of fruit is completely severed.

14. Apparatus for extracting juice from fruit such as oranges comprising a pair of rolls adapted to squeeze severed sections of fruit therebetween, a hopper for receiving fruit to be juiced having an outlet passageway leading toward said rolls and adapted to bring pieces of said fruit into single file alignment at a location spaced from and in advance of said rolls, means for severing each of said pieces of fruit during its movement from said location toward said rolls including a reciprocable knife element and a feeding member for successively urging each piece of fruit past said knife element, a reciprocable pusher member for positively urging severed sections of fruit toward and against said rolls, a driving member, means operatively connecting said driving member and said knife element for reciprocating the latter, means operatively connecting said feeding member of said severing means and said pusher member with said driving member for propelling said feeding and pusher members through their respective operating strokes in a predetermined timed relationship, and means operatively connecting said driving member and said rolls for rotating the latter at sufficient speed to remove the cut sections of one piece of fruit from the space between said rolls and said knife before the sections of the next successive piece of fruit are delivered to said space.

15. Apparatus for extracting juice from fruit such as oranges comprising a pair of rolls adapted to squeeze severed sections of fruit therebetween, a hopper for receiving fruit to be juiced having an outlet passageway leading toward said rolls and adapted to bring pieces of said fruit into single file alignment at a location spaced from and in advance of said rolls, a reciprocable knife element for severing each of said pieces of fruit during its movement from said location towards said rolls, a primary feeding member for successively urging said pieces of fruit past said knife element comprising a member engageable with a piece of fruit at a location on one side thereof, a secondary feeding member engageable with said piece of fruit at a location on the opposite side thereof for holding said piece of fruit against movement with said knife element and assuring movement of said pieces of fruit completely past the latter, a reciprocable pusher member for positively urging severed sections of each piece of fruit toward and against said rolls, and mechanism for drivingly rotating said rolls and reciprocating said knife element including means for propelling said primary and secondary feeding members and said reciprocable pusher member through their respective operative strokes in a predetermined timed relation.

16. Apparatus for extracting juice from articles of fruit comprising a pair of rolls adapted to squeeze sections of an article of fruit therebetween, means for delivering articles of fruit in single file alignment at a location spaced from and in advance of said rolls, means for severing each of said articles of fruit during its movement toward said rolls including a reciprocable knife element in the path of said articles of fruit at a position between said rolls and said location, feeding mechanism comprising a pusher element shiftably mounted for movement toward and away from said rolls for positively propelling a severed section of an article of fruit to and against said rolls during shifting movement of said pusher element toward said rolls, and mechanism for drivingly rotating said rolls, reciprocating said knife element and shifting said pusher element toward and away from said rolls respectively.

17. Apparatus for extracting juice from fruit comprising a pair of members adapted to squeeze sections of fruit therebetween, one of said members comprising a roll, means for delivering pieces of fruit to be juiced in single file alignment at a location spaced from and in advance of said members, means for severing each of said pieces of fruit during its movement from said location toward said members including a reciprocable knife element and a feeding member for successively urging said pieces of fruit past said knife element, a shiftable pusher member for positively urging severed sections of fruit toward and against said members, and mechanism for drivingly rotating said roll and reciprocating said knife element including means for propelling said feeding member of said severing means and said shiftable pusher member through their respective operative strokes in a predetermined timed relation.

18. Apparatus for extracting juice from fruit comprising a pair of members adapted to squeeze a section of fruit therebetween, one of said members comprising a roll, means for delivering a piece of fruit to be juiced at a location spaced from and in advance of said members, means defining a path for movement of said fruit from said location toward said members, means for severing said piece of fruit during movement thereof toward said members including a reciprocable cutter element in said path, a shiftable pusher element for positively propelling a severed section of said piece of fruit to and against said members, and mechanism for drivingly rotating said roll, reciprocating said cutter element and shifting said pusher element toward said members.

19. Apparatus for extracting juice from fruit comprising a pair of members adapted to squeeze a section of fruit therebetween, one of said members comprising a roll, means for delivering pieces of fruit in single file alignment at a location spaced from and in advance of said members, means defining a path for movement of said fruit from said location toward said members, means for severing each of said pieces of fruit during its movement from said location toward said members including a cutter element movable transversely of said path and a feeding member for successively urging each piece of fruit past said cutter element, a pusher member for positively urging severed sections of fruit toward and against said roll, a driving member, means operatively connecting said driving member and said cutter element for moving the latter transversely of said path, means operatively connecting said feeding member of said severing means and said pusher member with said driving member for propelling said feeding and pusher members through their respective operating strokes in a predetermined timed relationship, and means operatively connecting said driving member and said roll for rotating the latter at sufficient speed to remove the cut sections of one piece of fruit from the space between said rolls and said cutter element before the sections of the next successive piece of fruit are delivered to said space.

RAYMOND E. HEWLETT.

REFERENCES CITED

The following references are of record in the file of this patent:

UNITED STATES PATENTS

| Number | Name | Date |
|---|---|---|
| 621,773 | Blatz | Mar. 21, 1899 |
| 1,620,551 | Hughes | Mar. 8, 1927 |
| 1,638,618 | Catoldo | Aug. 9, 1927 |
| 2,010,467 | Rowan | Aug. 6, 1935 |
| 2,065,271 | Faulds | Dec. 22, 1936 |
| 2,205,059 | Clark | June 18, 1940 |
| 2,212,066 | Fry | Aug. 20, 1940 |
| 2,354,721 | Walker et al. | Aug. 1, 1944 |
| 2,393,334 | Mobley et al. | Jan. 22, 1946 |